United States Patent
Long et al.

(10) Patent No.: US 10,193,400 B2
(45) Date of Patent: Jan. 29, 2019

(54) METHOD OF AND APPARATUS FOR DETECTING COIL ALIGNMENT ERROR IN WIRELESS INDUCTIVE POWER TRANSMISSION

(71) Applicant: Momentum Dynamics Corporation, Malvern, PA (US)

(72) Inventors: Bruce Richard Long, Malvern, PA (US); Andrew William Daga, Malvern, PA (US)

(73) Assignee: Momentum Dynamics Corporation, Malvern, PA (US)

(*) Notice: Subject to any disclaimer, the term of this patent is extended or adjusted under 35 U.S.C. 154(b) by 548 days.

(21) Appl. No.: 14/910,071

(22) PCT Filed: Aug. 6, 2014

(86) PCT No.: PCT/US2014/049928
§ 371 (c)(1),
(2) Date: Feb. 4, 2016

(87) PCT Pub. No.: WO2015/021144
PCT Pub. Date: Feb. 12, 2015

(65) Prior Publication Data
US 2016/0181875 A1    Jun. 23, 2016

Related U.S. Application Data

(60) Provisional application No. 61/862,572, filed on Aug. 6, 2013.

(51) Int. Cl.
*H02J 50/90* (2016.01)
*H02J 50/12* (2016.01)
*H02J 7/02* (2016.01)

(52) U.S. Cl.
CPC .............. *H02J 50/90* (2016.02); *H02J 7/025* (2013.01); *H02J 50/12* (2016.02)

(58) Field of Classification Search
CPC ............. H02J 50/12; H02J 50/90; H02J 7/025
(Continued)

(56) References Cited

U.S. PATENT DOCUMENTS

| | | | |
|---|---|---|---|
| 9,941,753 B2 * | 4/2018 | Asanuma | H02J 50/90 |
| 2008/0054887 A1 * | 3/2008 | Lee | G01D 5/2053 |
| | | | 324/207.17 |

(Continued)

FOREIGN PATENT DOCUMENTS

| CN | 101971453 A | 2/2011 |
|---|---|---|
| CN | 103109333 A | 5/2013 |

(Continued)

OTHER PUBLICATIONS

"Chinese Application Serial No. 201480050370.4, Office Action dated Nov. 16, 2017", w English Claims, 13 pgs.

(Continued)

*Primary Examiner* — Edward Tso
*Assistant Examiner* — Manuel Hernandez
(74) *Attorney, Agent, or Firm* — Schwegman Lundberg & Woessner, P.A.

(57) ABSTRACT

A method for detecting induction coil alignment error in resonant induction wireless power apparatus includes an eddy current coil array superimposed upon the primary induction coil, a switching device for each eddy current coil, a voltage detector such as a low power rectifier connected to the secondary induction coil, an analog-to-digital converter, primary and secondary side micro-controllers, and, in a vehicle charging embodiment, a vehicle operator interface. During coil alignment, the primary side induction coil (Continued)

operates at low power. Eddy current flows in an eddy current coil only if the associated switching device is switched on.

22 Claims, 3 Drawing Sheets

(58) Field of Classification Search
USPC .......................................... 320/108; 307/104
See application file for complete search history.

(56) References Cited

U.S. PATENT DOCUMENTS

| | | | |
|---|---|---|---|
| 2009/0001941 A1* | 1/2009 | Hsu | H02J 7/0044 |
| | | | 323/211 |
| 2009/0096413 A1 | 4/2009 | Partovi et al. | |
| 2011/0004278 A1* | 1/2011 | Aghassian | A61N 1/3787 |
| | | | 607/61 |
| 2011/0148404 A1 | 6/2011 | Nishimizu et al. | |
| 2012/0112553 A1 | 5/2012 | Stoner, Jr. et al. | |
| 2012/0161696 A1 | 6/2012 | Cook et al. | |
| 2012/0212073 A1 | 8/2012 | Azancot et al. | |
| 2013/0043888 A1 | 2/2013 | Soar | |
| 2013/0049484 A1 | 2/2013 | Weissentern et al. | |
| 2013/0154649 A1 | 6/2013 | Candy | |
| 2013/0162054 A1 | 6/2013 | Komiyama | |
| 2013/0175983 A1 | 7/2013 | Partovi et al. | |
| 2017/0093223 A1* | 3/2017 | Kai | H02J 17/00 |
| 2018/0191207 A1* | 7/2018 | Asanuma | H02J 50/90 |

FOREIGN PATENT DOCUMENTS

| | | | |
|---|---|---|---|
| JP | 2010527226 | 8/2010 | |
| JP | 2010206865 | 9/2010 | |
| JP | 2013031315 | 2/2013 | |
| JP | 2013132133 | 7/2013 | |
| JP | 2013529451 | 7/2013 | |
| WO | WO-2012061378 A3 | 5/2012 | |
| WO | 2013061615 | 5/2013 | |
| WO | WO 2017165549 A1 * | 9/2017 | .......... H04B 5/0037 |

OTHER PUBLICATIONS

"Chinese Application Serial No. 201480050370.4, Office Action dated Nov. 16, 2017", w/English Translation, 10 pgs.

"European Application Serial No. 14834116.7, Extended European Search Report dated Feb. 9, 2017", 6 pgs.

"European Application Serial No. 14834116.7, Response filed Sep. 4, 2017 to Extended European Search Report dated Feb. 9, 2017", 16 pgs.

"European Application Serial No. 14834116.7, Response filed Oct. 10, 2016 to Communication pursuant to Rules 161(1) and 162 EPC dated Apr. 4, 2016", 6 pgs.

"International Application Serial No. PCT/US2014/049928, International Preliminary Report on Patentability dated Mar. 21, 2016", 17 pgs.

"International Application Serial No. PCT/US2014/049928, International Search Report dated Nov. 19, 2014", 3 pgs.

"International Application Serial No. PCT/US2014/049928, Written Opinion dated Nov. 19, 2014", 12 pgs.

* cited by examiner

METHOD OF AND APPARATUS FOR DETECTING COIL ALIGNMENT ERROR IN WIRELESS INDUCTIVE POWER TRANSMISSION

CROSS-REFERENCE TO RELATED APPLICATIONS

This application is a National Stage Application filed under 35 U.S.C. 371 of International Application No. PCT/US2014/049928, filed Aug. 6, 2014, which claims the benefit of U.S. Provisional Application No. 61/862,572, filed Aug. 6, 2013, the disclosure of which are incorporated herein by reference in their entireties.

TECHNICAL FIELD

This patent application pertains to the transmission of electrical energy by means of resonant magnetic induction. More specifically, it describes a method of and apparatus for detecting axial misalignment of resonant inductive wireless power transfer coils and providing an indication of the magnitude and direction of the alignment error so that the alignment error can be minimized or eliminated thereby ensuring efficient wireless power transfer.

BACKGROUND

Inductive power transmission has many important applications across multiple industries and markets. FIG. 1 shows a conceptual representation of a conventional resonant inductive power transmission system. In FIG. 1, DC power supply 10, inverter 12, and resonating network 14 cooperate to provide a source of alternating electrical energy that is applied to the primary induction coil 16. Magnetic coupling between the primary induction coil 16 and a secondary induction coil 18 transfers energy to the secondary induction coil 18, which is removed by some distance from the primary induction coil 16. The primary and secondary induction coils 16, 18 constitute a loosely coupled air core transformer. Resonance applied to the primary induction coil 16 increases primary side inductor current producing a corresponding increase in the magnetic flux in the secondary inductor current and, therefore, in the power transferred from the primary to the secondary. The secondary inductor current is processed by a resonating network 20 and is rectified by a high-power rectifier 22 for application to DC load 24 in a conventional manner.

Efficient resonant inductive wireless power transfer requires that a significant portion of the magnetic flux lines emitted by the sending coil travel through the area contained by the perimeter of the receiving coil so as to maximize magnetic coupling. Axial coil misalignment significantly reduces coil-to-coil magnetic coupling and therefor detracts from efficient power transfer. Furthermore, axial coil misalignment alters coil inductance from expected design values leading to loss of resonance and additional power transfer inefficiencies.

Coil axial alignment errors are encountered routinely and present a critical problem for manufacturers of electric and electric-hybrid vehicles that require a wireless source of external source of power. It is desired to develop a system for charging vehicles that identifies the magnitude and direction of coil alignment error and provides steering information to a human driver or non-human apparatus in order that the vehicle may be positioned with minimal coil alignment error. The present invention addresses these needs in the art.

SUMMARY

An axial alignment error detection apparatus and associated method that meets the afore-mentioned needs in the art includes several (e.g. four) arc segment eddy current coils superimposed on the primary induction coil of a conventional resonant inductance wireless power transmission system. The linear sections of the eddy coil perimeters align with the forward-reverse and left-right axes of the primary induction coil. Each arc segment eddy current coil connects to a bridge rectifier, and a switching element such as a field effect transistor. The switching elements are activated singularly or in unison by a sequencer.

On the vehicle side of the wireless power transmission system, the secondary induction coil connects to a resonating network, a high power rectifier, and a DC load as in conventional resonant induction wireless power transmission systems. The axial alignment error detection system of the invention adds a voltage detector including a low power rectifier, an Analog-to-Digital Converter (ADC), a data link, a microcontroller, and a vehicle operator interface to the conventional vehicle side resonant induction wireless power transmission system.

In operation, on the primary side of the resonant induction wireless power transfer apparatus, a direct current power supply is generally driven by commercial alternating line current. The resulting direct current powers an inverter stage that generates a square, rectangular or sinusoidal waveform at the resonant frequency of the primary and secondary induction coils. If the arc segment eddy current coil switching elements are all commanded into the off state by the sequencer, the eddy current coils are effectively open circuited, no current flows in the arc segment eddy current coils, and the operation of the conventional art resonant induction wireless power transmission apparatus is not affected nor altered to any significant extent.

However, if one or more of the eddy current control elements are active, eddy currents flow in the corresponding eddy current coils and, in accordance with Lentz's law, the eddy currents reduce the combined magnetic flux enclosed within the eddy coil perimeter, thereby reducing the net magnitude of the primary coil flux in that quadrant. The sequencer communicates to the vehicle side portion of the alignment apparatus which eddy current coils are active during alignment error determination by means of a short ranged data link. Bridge rectifiers allow conventional unidirectional semiconductor switching elements, such as field effect or bipolar transistors, to control the alternating current present in an activated arc segment eddy current coil. Alternatively, a unidirectional, alternating current semiconductor switch comprising two field effect transistors connected source-to-source, and gate-to-gate can be used for eddy current coil control elements in place of the single transistor, bridge rectifier combination.

During the coil alignment measurement interval, spatial-temporal variations in the primary coil flux induced by the eddy current coils are detected by a voltage detector including the low power rectifier, converted to digital representation by the analog-to-digital converter, and processed by the microcontroller. An active eddy current coil has the effect of reducing the magnetic flux intercepted by the secondary induction coil, thereby reducing the voltage generated by the low power rectifier.

Alignment may be detected by activating the eddy current coils sequentially. If the primary and secondary induction coils are axially aligned, the magnetic flux field disturbances induced by the individual eddy coils will have equal magnitude and there will be no variations of the secondary induction coil detected voltage during the eddy current coil switching sequence. If, however, the primary and secondary induction coils are misaligned, there will be variations of the secondary induction coil detected voltage during the eddy current coil switching sequence. The magnetic flux reduction effect is largest for those eddy current coils with the greatest overlap of the secondary coils and the magnitude of the detected variation indicates the extent of the overlap. Large overlaps create large variation and small overlaps generate proportionally smaller variation.

Correspondence between the eddy current coil switch sequence and the largest magnetic flux variation indicates the error vector direction, while the magnitude of the magnetic flux variations indicates the error vector magnitude. Identification of which eddy current coil is active is provided by the data link. Thus, the alignment error vector components, offset direction and magnitude may be easily determined and communicated to the vehicle operator.

The induction coil alignment apparatus is also used in non-vehicle applications such as portable consumer electronic device chargers, such as those (e.g., PowerMat™) used to charge toothbrushes, cellular telephones, and other devices. These and other embodiments of the invention will be apparent to those skilled in the art from the following detailed description.

DETAILED DESCRIPTION OF ILLUSTRATIVE EMBODIMENTS

Figure 1:
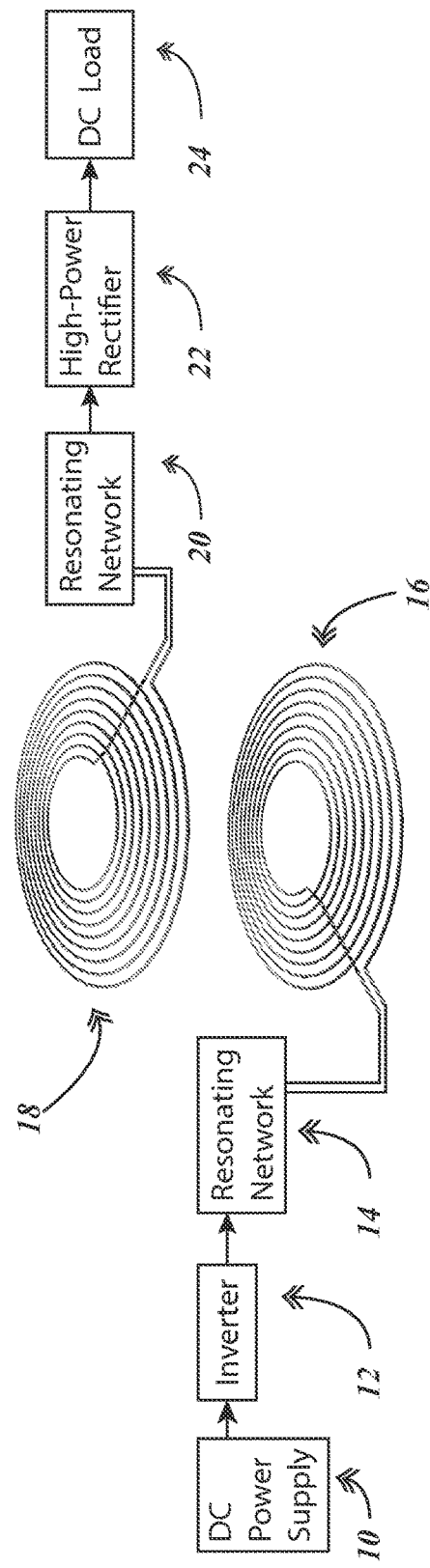
FIG. 1 shows a conceptual representation of a prior art resonant inductive power transmission system.

An exemplary embodiment of the invention will be described with respect to FIGS. 2 and 3 for use in charging electrically powered vehicles, although those skilled in the art will appreciate that the teachings provided herein may be used to determine alignment error in other non-vehicular resonant magnetic induction wireless power transfer systems. Such embodiments are intended to be within the scope of the present disclosure.

Many methods to achieve coil alignment have been proposed employing acoustic techniques, microwave and radio frequency techniques, combined acoustic-radio frequency differential propagation velocity systems, ultra wideband systems, infrared, optical, and video systems, video pattern recognition controlled robotic arms, differential GPS systems and mechanical alignment aids such as vehicle tire guides and bumper stops. Each has limitations including cost, complexity, and susceptibility to dirt, ice and moisture, lack of sufficient accuracy, need for an unobstructed view of the sky, and the need for the addition of apparatus beyond that already in place for wireless power transfer.

An unaltered, un-supplemented wireless power transfer apparatus can give a primitive indication of coil alignment error as, ignoring resonance de-tuning effects, transferred power is maximized when alignment error is zero. Consequently, less than expected power transfer implies some measure of misalignment. Because resonant inductive wireless power transfer primary coils have axial symmetry, in the case of circular or square primary coils, or quadratic symmetry in the case of rectangular or oval primary coils, the projected flux pattern is symmetrical as well, making determination of alignment error azimuth impossible. The alignment error magnitude may be supposed but not the error direction.

The solution to this problem in accordance with the invention is to introduce spatial asymmetries in the magnetic flux field surrounding the primary induction coil that thereby enable error azimuth determination. One way to do this is to add auxiliary coils superimposed upon or just outside of the perimeter of the primary induction coil 16. Each auxiliary coil is driven by a generator to generate magnetic flux that can supplement or partially cancel the magnetic flux generated by the primary induction coil 16 and in this way generate the axial asymmetry needed for error vector determination. However, there are several practical difficulties with this approach. First is the need for auxiliary coil drive circuitry beyond that needed to drive the primary induction coil 16. A second difficulty arises from the resonance generating network connected between the main power driver and the primary induction coil 16. The phase shift of the resonating network makes the phase relationship between the primary induction coil 16 and the primary induction coil currents somewhat ambiguous. Therefore, the auxiliary coil drivers must monitor the primary induction coil current using it as a reference in the generation of auxiliary coil currents, an undesirable requirement that increases apparatus cost and complexity. Auxiliary coil current generation and control is further complicated by the presence of substantial induced voltage in the auxiliary coils as well as auxiliary coil to auxiliary coil mutual coupling which makes the drive point impedance, complex and potentially unstable.

Figure 2:
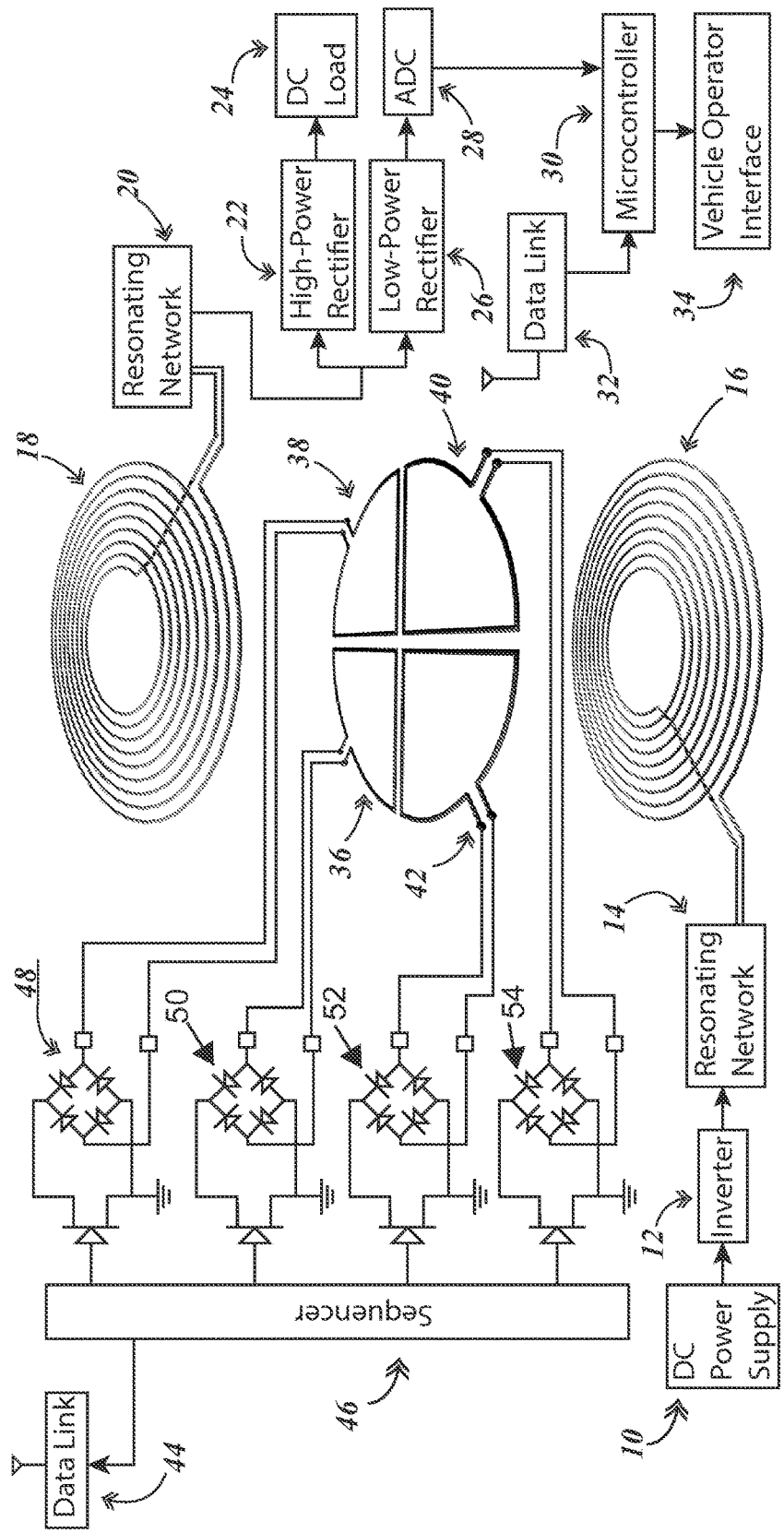
FIG. 2 shows a prior art resonant inductive power transmission system with alignment error detection apparatus in accordance with a first embodiment of the invention.

The difficulties and complexities described above are avoided in the exemplary embodiment shown in FIG. 2. The radial arc segment eddy current coils 36, 38, 40, and 42 are driven by magnetic induction; no auxiliary inverters are required and drive current phase ambiguity is entirely avoided. Auxiliary inverter circuits for each radial arc segment eddy current coil 36, 38, 40, and 42 are replaced with a bridge rectifier and switching transistor 48, 50, 52, and 54, respectively. The bridge rectifiers 48, 50, 52, and 54 allow control of bi-directional eddy currents with a single unidirectional semiconductor switch, thereby enabling the unidirectional, direct current switching device to allow or prevent the flow of induced eddy currents in the associated eddy current coil 36, 38, 40, or 42. In an exemplary embodiment, the primary induction coil 16 is operated at low power during the alignment error detection operation thereby mitigating undesired parasitic eddy currents induced into the vehicle underbody and excessive magnetic field leakage that can result during high power operation with significantly misaligned primary and secondary induction coils 16, 18. It will be appreciated by those skilled in the art that a unidirectional, alternating current semiconductor switch comprising two field effect transistors connected source-to-source and gate-to-gate can be used for eddy current coil control elements in place of the single transistor, bridge rectifier combination illustrated in FIG. 2.

In accordance with Lentz's law, eddy currents flowing in an activated eddy current coil generate a magnetic flux in opposition to the incident magnetic flux field, thereby diminishing the net magnetic flux field directly above the active eddy current coil. The locally diminished magnetic flux field in turn reduces the magnitude of the voltage or current induced into the secondary, vehicle side coil 18. If the primary and secondary induction coils 16, 18 are axially aligned, all active eddy current coils 36, 38, 40, and 42 reduce the induced secondary coil voltage or current to the same extent. However, if the secondary induction coil 18 is displaced out of axial alignment, for example, to the back and to the right, the back-right eddy current coil will influence the secondary induction coil induced voltage or current to a greater extent than the other three eddy current coils with the degree of influence being proportional to the alignment error magnitude. This means the direction and the magnitude of the alignment error is readily determined by sequentially activating the eddy current coils 36, 38, 40, and 42 using sequencer 46 and noting the secondary coil induced voltage or induced current amplitude variations that result. Secondary side alignment error determination requires knowledge of which eddy current coil is active at all times during the alignment error determination process, with such knowledge communicated to the secondary side microcontroller 30 by means of the data link including primary side data link 44 and secondary side data link 32.

Consider the case where the sequencer 46 shown in FIG. 2 activates the arc segment eddy current coils 36, 38, 40, and 42 in the sequence indicated in Table 1:

TABLE 1

Exemplary Sequencer Sequence

| State | Coils Activated |
|---|---|
| 1 | Front Right |
| 2 | Back-Right |
| 3 | Back-Left |
| 4 | Front-Left |

The fourth sequencer state is followed by return to the first state of the sequence and the pattern repeats. During each equal duration sequencer state the secondary side microcontroller 30 measures and records the secondary coil induced voltage, $E_{IND}$, by means of a voltage detector such as low power rectifier 26, which provides the measured voltage to Analog-to-Digital Converter (ADC) 28 for digitization prior to application to microcontroller 30.

In this example, Front-Back alignment error is determined as:

$$AE_{FB} = [E_{IND-FL} + E_{IND-FR}] - [E_{IND-BL} + E_{IND-BR}]$$

Where $AE_{FB}$ is the Front-Back alignment error,
$E_{IND-FL}$ is the secondary coil voltage with the Front-Left eddy current coil activated,
$E_{IND-FR}$ is the secondary coil voltage with the Front-Right eddy current coil activated,
$E_{IND-BL}$ is the secondary coil voltage with the Back-Left eddy current coil activated, and
$E_{IND-BR}$ is the secondary coil voltage with the Back-Right eddy current coil activated.
When $AE_{FB} = 0$, the Front-Back alignment error is zero,
$AE_{FB} > 0$, the vehicle is too far to the front and $|AE_{FR}|$ indicates the error magnitude, and
$AE_{FB} < 0$, the vehicle is too far to the back and $|AE_{FR}|$ indicates the error magnitude.

In this example, Left-Right alignment error is determined as:

$$AE_{LR} = [E_{IND-FL} + E_{IND-BL}] - [E_{IND-FR} + E_{IND-BR}]$$

Where $AE_{LR}$ is the Left-Right alignment error,
$E_{IND-FL}$ is the secondary coil voltage with the Front-Left eddy current coil activated,
$E_{IND-BL}$ is the secondary coil voltage with the Back-Left eddy current coil activated,
$E_{IND-FR}$ is the secondary coil voltage with the Front-Right eddy current coil activated, and
$E_{IND-BR}$ is the secondary coil voltage with the Back-Right eddy current coil activated.
When $AE_{LR} = 0$, the Left-Right alignment error is zero,
$AE_{LR} > 0$, the vehicle is too far to the left and $|AE_{LR}|$ indicates the error magnitude, and
$AE_{LR} < 0$, the vehicle is too far to the right and $|AE_{LR}|$ indicates the error magnitude.

Right-to-left and front-to-back alignment error magnitudes may be combined into a single alignment error vector by use of conventional vector arithmetic known to those skilled in the art. Any misalignment of the primary and secondary induction coils 16, 18 is communicated to the user/vehicle operator via a vehicle operator interface 34 so that the appropriate adjustments may be made by the user/vehicle operator to improve the alignment of the primary and secondary induction coils 16, 18.

Those skilled in the art will appreciate other sequencer switching patterns are possible including sequential activation of single or multiple eddy current coils 36, 38, 40, and 42 in a clockwise or counter-clockwise pattern or simultaneous activation of several or all eddy current coils 36, 38, 40, and 42 with each coil driven by a unique clock with error magnitude and direction determined by means of mathematical processing of the resulting secondary induction coil induced voltage.

Figure 3:
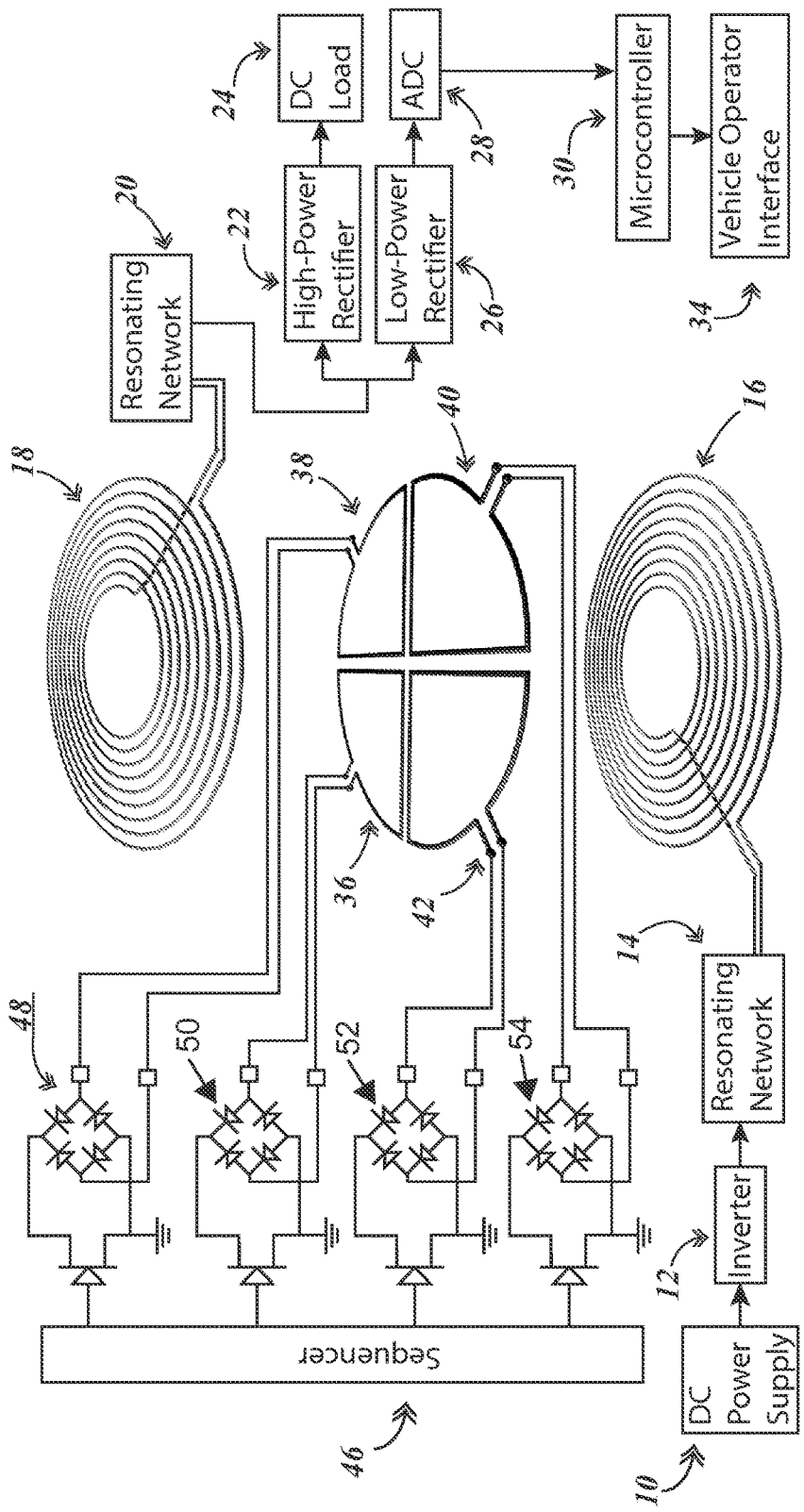
FIG. 3 shows a prior art resonant inductive power transmission system with alignment error detection apparatus that functions without a vehicle to ground data link in accordance with a second embodiment of the invention.

FIG. 3 shows a second embodiment that eliminates the need for a primary side-to-secondary side data link 44, 32. In this embodiment, the sequencer 46 drives all four arc segment eddy current coils 36, 38, 40, and 42 simultaneously with the front-left coil driven by a square wave clock at frequency $f_1$, the front-right eddy coil driven at frequency $f_2$, the back-right eddy current coil driven at frequency $f_3$, and the back-left eddy current coil driven at frequency $f_4$. The frequency difference between the highest and the lowest frequency should be less than an octave to avoid confusion of generated actual clock frequencies and clock frequency harmonics possibly generated by distortion. For example, the four sequencer clock frequencies $f_1$, $f_2$, $f_3$, and $f_4$, could be 800, 900, 1000 and 1100 Hertz. Also, rectangular wave and sinusoidal waveforms may also be used at the respective frequencies $f_1$-$f_n$, where n is the number of eddy current coils.

On the secondary side, the microcontroller 30 examines the data time series generated by the Analog-to-Digital-Converter 28 and performs a fast Fourier transform or similar time domain to frequency domain conversion on the ADC data time series. FFT parameters are selected such that each sequencer clock tone falls uniquely into a single frequency domain bin. In this way, the FFT operation by microcontroller 30 determines the relative contributions of the quadrature eddy current coils 36, 38, 40, and 42. Equal sequencer clock tone amplitudes indicate zero alignment error. Unequal clock tone amplitudes indicate an alignment error and the clock tone amplitude ratios indicate the magnitude and direction of the alignment error. Microcontroller FFT computation requirements are low because high frequency resolution is not required and the number of FFT arithmetic calculations is low. A data link is not required because each eddy current coil is uniquely identified by its specific modulation frequency.

The number of eddy current coils 36, 38, 40, and 42 and the coil arc width may vary. For example, four overlapping "D" shaped coils each covering a 180 degree arc width segment, two coils for front-back error determination and another two coils used for left-right error determination may be used. Alternatively, three, non-overlapping eddy current coils each covering a 120 degree arc can be used. Furthermore, a large number of eddy current coils may be used each encompassing an arc width segment less than 90 degrees to improve alignment error accuracy and resolution.

In addition, rectifier configurations other than the bridge rectifier configuration may be used for eddy current coil control. Also, the rectifier-transistor eddy current control pair may be replaced with a bi-directional control device such as a relay closure, a TRAC diode, or similar device. Also, with appropriate circuit switching and overload protection, the low power rectifier block 26 in FIG. 2 and FIG. 3 may be eliminated with the high power rectifier 22 used instead.

Further, while the disclosure contained herein pertains to the provision of electrical power to vehicles, it should be understood that this is only one of many possible applications, and other embodiments including non-vehicular applications are possible. For example, those skilled in the art will appreciate that there are numerous applications of induction coil alignment in non-vehicle applications such as portable consumer electronic device chargers, such as those (e.g., PowerMat™) used to charge toothbrushes, cellular telephones, and other devices. Such devices use one or more windings and alignment is an issue. Even with overlapping coils, the alignment technology described herein may help to increase the power transfer. In an exemplary embodiment for a cell phone charger, an app or other notifying means is loaded onto the cell phone that causes the cell phone to make a sound or vibrate when properly aligned over the charging coil. This is particularly useful for vehicle applications where it is desirable to indicate alignment of the phone with the charger without the driver having to look down. Accordingly, these and other such applications are included within the scope of the following claims.

What is claimed:

1. An apparatus for detecting coil alignment error in a wireless resonant inductive power transmission system comprising a primary inductive coil and a secondary inductive coil arranged to constitute a loosely coupled air core transformer whereby power in the primary inductive coil is transferred to the secondary inductive coil when the primary inductive coil is activated, comprising:
    at least two arc segment eddy current coils superimposed on the primary inductive coil, said at least two arc segment eddy current coils arranged to correspond with respective sectors of the primary inductive coil whereby an active eddy current coil has the effect of reducing a magnetic flux intercepted by the secondary inductive coil;
    a switch connected to each arc segment eddy current coil;
    a sequencer arranged to selectively activate the switch connected to each arc segment eddy current coil singularly or in unison in a switching sequence; and
    a voltage detector that detects voltage variations in the secondary inductive coil during said switching sequence, whereby alignment of said primary inductive coil and said secondary inductive coil is detected by activating the eddy current coils sequentially and measuring detected voltage variations of the secondary inductive coil during the eddy current coil switching sequence, and whereby correspondence between the eddy current coil switching sequence and a largest magnetic flux variation of said secondary inductive coil indicates an error vector direction and a magnitude of magnetic flux variations of the secondary inductive coil indicate an error vector magnitude.

2. The apparatus of claim 1, further comprising a bridge rectifier connected to each arc segment eddy current coil to control an alternating current present in an arc segment eddy current coil that is sequentially activated according to said switching sequence.

3. The apparatus of claim 1, further comprising a wireless data link between said sequencer and said voltage detector, said data link communicating an indication of which eddy current coil is active at all times during an alignment error detection process from said sequencer to said voltage detector.

4. The apparatus of claim 1, wherein said voltage detector comprises a low power rectifier and an analog-to-digital converter that converts an output of said low power rectifier to digital data that is processed by a microcontroller to detect said correspondence between the eddy current coil switching sequence and a largest magnetic flux variation of said secondary inductive coil and a magnitude of said magnetic flux variations of the secondary inductive coil.

5. The apparatus of claim 4, further comprising a user interface connected to said microcontroller for display of said error vector direction and said error vector magnitude to a user of said apparatus for use in adjustment of alignment of said primary inductive coil and said secondary inductive coil using said error vector direction and said error vector magnitude.

6. The apparatus of claim 5, wherein said primary inductive coil is interfaced to a charger, said secondary inductive coil is interfaced to a vehicle, and said user interface provides said error vector direction and said error vector magnitude to an operator of said vehicle.

7. The apparatus of claim 1, wherein the sequencer drives each arc segment eddy current coil simultaneously at different clock frequencies.

8. The apparatus of claim 7, wherein said sequencer drives each arc segment eddy current coil with a square wave, a rectangular wave, or a sinusoidal waveform at different clock frequencies.

9. The apparatus of claim 7, wherein said voltage detector comprises a low power rectifier and an analog-to-digital converter that converts an output of said low power rectifier to digital data that is processed by a microcontroller to detect said correspondence between the eddy current coil switching sequence and a largest magnetic flux variation of said secondary inductive coil and a magnitude of said magnetic flux variations of the secondary inductive coil.

10. The apparatus of claim 9, wherein said microcontroller processes a digital data time series output by said analog-to-digital converter by performing a time domain to frequency domain conversion of the digital data time series and selecting time domain to frequency domain conversion parameters such that each clock tone of said sequencer falls uniquely into a single frequency domain slot, whereby said microcontroller determines relative contribution of said arc segment eddy current coils from clock tone amplitudes and clock tone amplitude ratios so as to determine a magnitude and direction of in said single frequency domain slots corresponding to each of said each arc segment eddy current coils.

11. The apparatus of claim 1, further comprising four overlapping "D" shaped eddy current coils, each covering a 180 degree arc width segment of said primary inductive coil, wherein two of said "D" shaped eddy current coils provide front-back error determination and another two of said "D" shaped eddy current coils provide left-right error determination.

12. The apparatus of claim 1, further comprising three non-overlapping eddy current coils, each of said non-overlapping eddy current coils covering a 120 degree arc width segment of said primary inductive coil.

13. A method of detecting of coil alignment error in a wireless resonant inductive power transmission system comprising a primary inductive coil and a secondary inductive coil arranged to constitute a loosely coupled air core transformer whereby power in the primary inductive coil is transferred to the secondary inductive coil when the primary inductive coil is activated, comprising the steps of:
arranging at least two arc segment eddy current coils so as to be superimposed on the primary inductive coil and to correspond with respective sectors of the primary inductive coil;
selectively activating said arc segment eddy current coils singularly or in unison in a switching sequence, whereby an active eddy current coil has the effect of reducing a magnetic flux intercepted by the secondary inductive coil;
detecting variations of a detected voltage of the secondary inductive coil during said switching sequence; and
detecting alignment of said primary inductive coil and said secondary inductive coil by activating the eddy current coils sequentially and measuring detected voltage variations of the secondary inductive coil during the eddy current coil switching sequence, whereby correspondence between the eddy current coil switching sequence and a largest magnetic flux variation of said secondary inductive coil indicates an error vector direction and a magnitude of magnetic flux variations of the secondary inductive coil indicate an error vector magnitude.

14. The method of claim 13, wherein each arc segment eddy current coil is sequentially activated according to said switching sequence.

15. The method of claim 14, further comprising communicating an indication of which eddy current coil is active at all times during an alignment error detection process from a sequencer that generates said switching sequence to a processor that determines whether said primary inductive coil and said secondary inductive coil are aligned.

16. The method of claim 13, further comprising displaying said error vector direction and said error vector magnitude to a user of said wireless resonant inductive power transmission system to enable the user to adjust alignment of said primary inductive coil and said secondary inductive coil using said error vector direction and said error vector magnitude.

17. The method of claim 13, wherein selectively activating said arc segment eddy current coils comprises activating each arc segment eddy current coil simultaneously at different clock frequencies.

18. The method of claim 17, wherein selectively activating said arc segment eddy current coils comprises activating each arc segment eddy current coil simultaneously with a square wave, a rectangular wave, or a sinusoidal waveform at different clock frequencies.

19. The method of claim 17, wherein measuring detected voltage variations of the secondary inductive coil during the eddy current coil switching sequence comprises said microcontroller processing a digital data time series of said digital data by performing a time domain to frequency domain conversion of the digital data time series and selecting time domain to frequency domain conversion parameters such that each clock tone of said switching sequence falls uniquely into a single frequency domain slot, and said microcontroller determining relative contribution of said arc segment eddy current coils from clock tone amplitudes and clock tone amplitude ratios so as to determine a magnitude and direction of in said single frequency domain slots corresponding to each of said each arc segment eddy current coils.

20. The method of claim 13, wherein detecting variations of a detected voltage of the secondary inductive coil during said switching sequence converting an output of a voltage detector on a secondary side of said wireless resonant inductive power transmission system to digital data that is processed by a microcontroller to detect said correspondence between the eddy current coil switching sequence and a largest magnetic flux variation of said secondary inductive coil and a magnitude of said magnetic flux variations of the secondary inductive coil.

21. The method of claim 13, further comprising displaying said error vector direction and said error vector magnitude to a user of said wireless resonant inductive power transmission system for use in adjustment of alignment of said primary inductive coil and said secondary inductive coil using said error vector direction and said error vector magnitude.

22. The method of claim 21, wherein said primary inductive coil is interfaced to a charger and said secondary inductive coil is interfaced to a vehicle, further comprising providing said error vector direction and said error vector magnitude to an operator of said vehicle.

* * * * *